INVENTOR.
WARREN U. AMFAHR
BY Marvin Moody
ATTORNEY

United States Patent Office 2,969,486
Patented Jan. 24, 1961

2,969,486
VOICE-OPERATED CONTROL SYSTEM
Warren U. Amfahr, Marion, Iowa, assignor to Collins Radio Company, Cedar Rapids, Iowa, a corporation of Iowa Filed Aug. 26, 1958, Ser. No. 757,296
2 Claims. (Cl. 317—148.5)

This invention relates to switching circuits in general and more particularly to voice-operated switching circuits.

Single-sideband type transmission has several distinct advantages over amplitude-modulated type transmission. One of these advantages is the inclusion of a voice-operated relay device wherein sound from the operator's voice speaking into a microphone causes the voice-operated relay device to switch an antenna from the receiver to the transmitter, and vice versa when the operator ceases to speak. Generally, the device also renders the idle unit inoperative so that telephone-type conversations can be conducted between several stations on the same frequency.

Prior to this invention, voice-operated switching circuits generally employed a large capacitor across the input or output of the relay amplifier for the purpose of delaying the dropping-out of the relay when the operator ceased talking for an instant. If the capacitor was large enough to provide the proper decay time, it generally was too large to provide the proper attack time. The decay time refers to the time required to de-energize the switching circuit after the last utterance of a spoken syllable, while the attack time refers to the time required to operate the switching circuit after the first utterance of a spoken syllable. Hence, if a large enough capacitor was utilized to provide a proper decay time, usually the attack time was so delayed as to clip part of the first spoken word. This defect obviously would result in short sentences being unintelligible. Conversely, if the capacitor was adjusted for a proper attack time, the decay time would become prohibitively short. Also prior systems had inadequate threshold characteristics. If the energy from the spoken communication was low enough so that the voltage developed across the changing capacitor was just sufficient to reach the threshold point of the switching system, the control relay had a tendency to chatter.

It is therefore an object of this invention to improve the attack time of the voice-operated relay system.

It is another object of the invention to improve the decay time of the system.

It is a further object to provide a means for adjusting the attack time and independently adjusting the decay time of the switching system.

It is still a further object of this invention to provide a positive latching type switching system thereby eliminating objectionable relay chatter.

This invention features a relay in combination with a transistor in which the input of the transistor has a relatively small capacity to ground in comparison to the relatively large capacity to ground used in prior switching circuits. The smaller capacitor provides for a rapid attack time since it can be charged in much less time.

This invention also features a precharged second capacitor which is serially connected to the first capacitor upon operation of the switching system. This capacitor performs two important functions. It raises the voltage of the charging capacitor well above the threshold point of the transistor thereby preventing relay chatter; and, it increases the capacity of the charging capacitor such that the RC time constant, which determines the decay time of the circuit, is greatly increased.

Still another feature incorporates an adjustable resistor which is placed in parallel with the second capacitor in order to provide an additional discharge path for the serially connected capacitors. Adjustment of this resistor will permit a wide variation of the switching circuit decay time.

These and other objects and features of the present invention will become apparent to those skilled in the art upon reference to the following specification, claims and drawing, in which:

Figure 1:
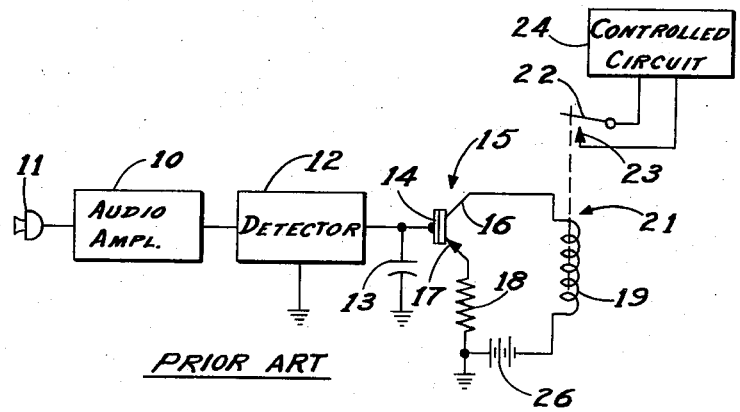
Figure 1 shows a voice-operated switching circuit well known in the art.

With reference to Figure 1, a well-known voice-operated relay system is depicted. It contains an audio amplifier 10 which has its input connected to a microphone 11 which may be of any well-known type. A detector 12 of a standard type is connected to the output of amplifier 10. A transistor 15 of the PNP type has its base 14 connected to the output of the detector and to ground through a charging capacitor 13. The emitter 17 of transistor 15 is connected to ground through a resistor 18. The collector 16 of transistor 15 is connected to a source of negative voltage 26 through a relay energizing coil 19. A pair of contacts 22 and 23 are connected to a circuit 24 (not shown) that is to be controlled.

In operation, sound picked up by microphone 11 is converted into a corresponding fluctuating voltage and applied to the input of amplifier 10. Following amplification and subsequent detection by detector 12, the rectified signal is applied to capacitor 13 and to base 14 of transistor 15. If the sound impinging upon microphone 11 is of sufficient amplitude and duration to overcome the contact potential of transistor 15 from the detector, the rectified voltage which is applied to capacitor 13 and base 14 will be sufficient to cause transistor 15 to conduct. Upon conduction the impedance will drop to a low value between collector 16 and emitter 17 of transistor 15, thereby providing a low impedance path between the relay energizing coil 19 and the voltage source 26. The current in this path will increase, which in turn will cause the relay 21 to operate closing contacts 22 and 23. The relatively low impedance path between 14 and 17 will furnish a discharge path for capacitor 13. Thus capacitor 13 must necessarily have a large RC time constant. The capacity of the single capacitor 13, therefore, must be selected not only for a long decay time which requires a large capacity, but also for a rapid attack time which requires a small capacity. Under these conflicting requirements, the capacity of capacitor 13 must be such that the best compromise between the required attack and decay time will be met for the circuit being controlled.

A further unsatisfactory condition develops when the charge on capacitor 13 is just sufficient to cause conduction of transistor 15. Under these circumstances, the relay will chatter as the transistor oscillates between a conductive and non-conductive state.

Figure 2:
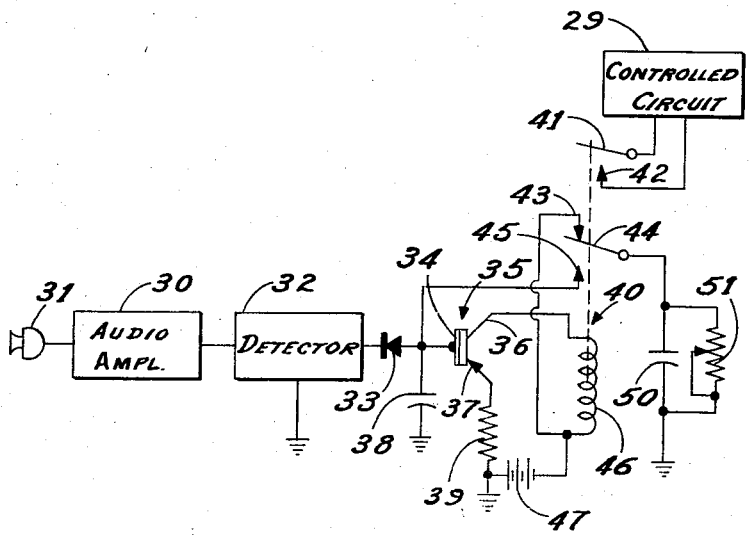
Figure 2 shows one embodiment of this invention.

Figure 2 is one embodiment of this invention that eliminates all of the disadvantages that have been specifically pointed out in prior switching circuits.

An amplifier 30 has a microphone 31 of any well-known type connected to its input. A detector 32, which may be a standard type such as a diode, is connected to the output of the amplifier 30. An isolation diode 33 has one end connected to the output of the detector 32 and the other end connected to the base 34 of a transistor 35. The base is also connected to ground through a charging capacitor 38. The emitter 37 of transistor 35 is connected to ground through a resistor 39.

A relay 40 includes two sets of switching contacts. The first set includes contacts 41 and 42 and is used to operate the controlled circuit 29. The second set includes contacts 43, 44, and 45 and is used to locate the termination of a charged capacitor 50. The relay 40 additionally contains an energizing coil 46 connected between the collector 36 of transistor 35 and a source of negative voltage 47. Switch armature 44 is connected to ground through a parallel network consisting of charged capacitor 50 and an adjustable resistor 51. The normally closed contact 43 is connected to voltage source 47. Normally open contact 45 is connected to the base 34 of the transistor 35.

In operation, sound waves impinging upon microphone 31 are converted into a corresponding fluctuating voltage and amplified by amplifier 30. Negative voltage from the detector 32 appears across charging capacitor 38 and forms a negative bias for transistor 35. Since capacitor 38 has a small capacity compared to capacitor 50, less charging energy is required to raise its potential to the point where transistor 35 will be biased to conduction. Upon conduction of transistor 35 the impedance between the collector 36 and the emitter 37 will drop to a low value. Inasmuch as this impedance is in series with the energizing coil 46 of relay 40 and voltage source 47, the current through the coil and transistor will increase. The increase in current will close the relay contacts 41 and 42 thereby switching controlled circuit 29. Simultaneously with the closing of contacts 41 and 42, armature 44 will disengage contact 43 and engage contact 45. This operation will remove supply voltage from the charged capacitor 50 and apply it to the charging capacitor 38. Thus all the energy stored on capacitor 50 is applied across both capacitors 38 and 50 which causes the potential across capacitor 38 to rise well above the threshold of the transistor. Hence, the threshold condition which produced relay chatter in prior delay circuits is eliminated. The decay time of the system which was determined by capacitor 13 (see Figure 1) alone is now determined by capacitor 38 in combination with charged capacitor 50, thereby resulting in a circuit which has a very rapid attack time and a long decay time. A potentiometer 51 may be applied across capacitor 50 to provide an additional resistive path to ground thereby permitting a variable decay time. However, it can be seen that by careful selection of both capacitors 38 and 50, a fixed attack time and decay time can be obtained. It is also obvious that a proper selection of capacitor 38 permits a variation in the attack time which is wholly independent of the decay time of the system.

An isolation diode 33 is included between the detector and the base of transistor 35 so that the voltage from storage capacitor 50 will be confined to the charging capacitor 38.

While a PNP transistor has been depicted in this embodiment, it is to be realized that by changing bias and supply voltages, other type transistors can be substituted.

Although this invention has been described with respect to a particular embodiment thereof, it is not to be so limited as changes and modifications may be made therein which are within the full intended scope of the invention as defined by the appended claims.

I claim:

1. A voice-operated relay circuit of the type which includes an input, an amplifying means connected to said input, a detecting means connected to the output of said amplifier, a transistor which includes a base, emitter, and collector, a first capacitive means, said detector and said first capacitive means connected to said transistor base, said emitter resistively connected to ground, a relay containing a pair of normally open contacts and an energizing coil, a source of voltage, said energizing coil connected between said collector and said source of voltage, said circuit additionally containing a second capacitive means, a second set of contacts for said relay including one set of contacts normally closed and one set of contacts normally open, said contacts containing a common armature, said second capacitive means connected between ground and to said source of voltage through said normally closed contacts and to said first capacitive means through said normally open contacts, whereby said second capacitive means is parallelly connected to said first capacitive means upon operation of said relay means thereby raising the voltage of said first capacitive means substantially above said transistor threshold voltage and additionally improving the attack and decay time of said relay circuit.

2. The device as claimed in claim 1 and additionally containing a variable resistor paralleling said second capacitive means wherein the time constant of the discharge path can be varied, thus varying the decay time of the relay circuit.

References Cited in the file of this patent

UNITED STATES PATENTS

| | | |
|---|---|---|
| 1,997,207 | Bjornson | Apr. 9, 1935 |
| 2,579,163 | Wald | Dec. 18, 1951 |
| 2,622,195 | Smith | Dec. 16, 1952 |
| 2,759,124 | Willis | Aug. 14, 1956 |
| 2,892,133 | Huge | June 23, 1959 |